United States Patent [19]

Shuman et al.

[11] 3,897,413

[45] July 29, 1975

[54] 2,6-DISUBSTITUTED PURINE CYCLIC NUCLEOTIDES

[75] Inventors: Dennis A. Shuman, Mission Viejo; Rich B. Meyer, Jr., Laguna Beach; Roland K. Robins, Santa Ana, all of Calif.

[73] Assignee: ICN Pharmaceuticals, Inc., Irvine, Calif.

[22] Filed: Nov. 22, 1971

[21] Appl. No.: 201,157

[52] U.S. Cl............................ 260/211.5 R; 424/180
[51] Int. Cl............................................. C07d 51/54
[58] Field of Search............................ 260/211.5 R

[56] References Cited
UNITED STATES PATENTS

| | | | |
|---|---|---|---|
| 3,225,029 | 12/1965 | Yamaoka...................... | 260/211.5 R |
| 3,627,753 | 12/1971 | Posternak et al............. | 260/211.5 R |
| 3,712,885 | 1/1973 | Weimann et al............. | 260/211.5 R |

OTHER PUBLICATIONS

Smith, "Jour. Amer. Chem. Soc.," Vol. 83, pp. 698–699, 1961.

*Primary Examiner*—Johnnie R. Brown
*Attorney, Agent, or Firm*—Lyon & Lyon

[57] ABSTRACT

Compounds of structure

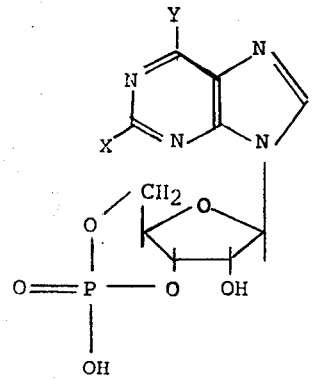

wherein X is Cl, F or Br and Y is Cl or Br, are prepared by diazotization of 2-amino-6-halo-9-$\beta$-D-ribofuranosylpurine 3',5'-cyclic phosphates in the presence of an appropriate concentrated halogen-containing acid. The 2' hydroxyl of the subject compounds may be $C_1$–$C_{18}$ acylated. The compounds are useful, e.g., as intermediates in the production of biologically active analogs of adenosine 3',5'-cyclic phosphate (cyclic AMP) such as 2-chloroadenosine 3',5'-cyclic phosphate.

6 Claims, No Drawings

2,6-DISUBSTITUTED PURINE CYCLIC NUCLEOTIDES

CROSS-REFERENCE TO RELATED APPLICATIONS

This application is related to co-pending U.S. patent applications Ser. Nos. 153,413 and 97,015, respectively filed June 15, 1971 and Dec. 10, 1970 by R. K. Robins, D. A. Shuman and Kei Muneyama, and both now abandoned.

BACKGROUND OF THE INVENTION

It is known that purine 3',5'-cyclic ribonucleotides are produced in vivo in living animals, including man, and that cellular levels of certain ones of them such as cyclic AMP are regulated by specific phosphodiesterases. The biological activity of these cyclic nucleotides naturally follows from such in vivo production and regulation. Indeed, as reported in Sutherland, et al, "Cyclic Amp" Ann. Rev. Biochem. 37, 149 (1968), cyclic AMP has now been established as an intracellular "second messenger" mediating many of the actions of a variety of different hormones.

According to the "second messenger" theory, first hormone messengers influence adenyl cyclase contained at or within cell walls to intracellularly form cyclic AMP from adenosine triphosphate upon receipt of the extracellular hormone signal. The formed cyclic AMP in turn stimulates intracellular functions particular to the target cells of the hormone. Cyclic AMP has been shown to "activate" protein kinases which in turn occasion physiological effects such as muscle contraction, glycogenolysis, steroidogenisis and lipolysis. As a specific example of mediation of steroidogenisis by cyclic AMP can be mentioned cellular biosynthesis and excretion of corticosteroids as occasioned by cyclic AMP formed by adenyl cyclase within the cell walls of the adrenal cortex upon receipt of an extracellular signal carried by the peptide hormone ACTH.

In addition to the foregoing and as representative of the diverse roles played by cyclic AMP in biological processes can be mentioned implication of cyclic AMP as a participant in or mediator of the following metabolic reactions or pharmacologic agents: glucagon, vasopressin, lutenizing hormone, thyroid-stimulating hormone, insulin, UDPG-α-trans-glucosylase, phosphofructokinase, tryptophan pyrrolase, ketogenesis, amino acid uptake into liver proteins, acetate incorporation into fatty acids and cholesterol of liver, conversion of lactate to glucose (gluconeogenesis), release of amylase, water and ion permeability, sugar transport, acid secretion in the gastric mucosa, platelet aggregation inhibition, catabolite repression, potentiation of antiviral activity of interferon, inhibition of HeLa and strain L cells in culture, and stimulation of antibody production (immunologic mechanism).

The so-called adrenergic effects of many hormones and drugs has not been attributed to the intracellular effects of cyclic AMP whose concentration is controlled by adenyl cyclase and cyclic nucleotide phosphodiesterase. Recent investigations have shown that at least part of the physiological effect of cyclic AMP is a result of the activiation of specific protein kinases by cyclic AMP as, for example, in neurotubules isolated from the central nervous system.

Corollary to increasing recognition of the role played by this purine cyclic nucleotide has come the suggestion that it be administered in aid of lagging cellular processes. As one example can be mentioned the report that asthma may be caused by a genetic deficiency of adenyl cyclase. A consequence of such deficiency, of course, is a diminished capacity to intracellularly convert ATP to cyclic adenosine monophosphate.

Increasing awareness of the significant role of cyclic AMP in biological processes has kindled efforts to produce similarly active analogs improved with respect to the naturally occuring nucleotide in, e.g., resistance to phosphodiesterase degradation. Thus, for example, in the aforementioned applications of Robins, Shuman and Muneyama and in Netherlands Pat. No. 7003222 to Boehringer Mannheim, Gmbh purine nucleoside 3',5'-cyclic phosphates are variously substituted at the 8-position, as with halogen. In Netherlands Pat. No. 6913671 to Boehringer, it is the 6-position of cyclic AMP and related purine 3',5'-cyclic nucleotides to which attention is paid in preparing, e.g., halogen-substituted analogs. Thus far, however, little attention has been directed to substitutive attack on the 2-position of cyclic AMP.

We envisioned 2,6-dihalopurine 3',5'-cyclic nucleotides as facile intermediates for production of numerous compounds of interest, and first attempted to secure the same by an adaptation of the method reported by Kawashima and Kumashiro in Bull. Chem. Soc. Japan 40, 639 (1967) for 2,6-dichloro-9-B-D-ribofuranosyl purine. Thus, inosine 3',5'-cyclic phosphate 1-N-oxide was prepared by deamination of adenosine 3',5'cyclic phosphate 1-N-oxide with nitrous acid in aqueous acetic acid. The 2'-hydroxyl was selectively acetylated and the product treated with refluxing $POCl_3$ in the presence of 2,6-lutidine or 2-picoline for 2 hours. The required conversion of the aglycon to 2,6-dichloropurine occured, but the cyclic phosphate moiety was cleaved. Electrophoresis showed the major product to be a phosphomonoester, only trace amounts of material having the mobility expected for a cyclic phosphate being observed. Shorter reaction times failed to yield the desired conversion of the purine moiety. In all, this unsuccessful attempt simply underlines the widely-recognized unpredictability associated with attempts to adapt nucleoside conversions to operations on cyclic nucleotides. In Netherlands Pat. No. 6913671 discussed above, for example, the applicants state that "the capability for reaction changes fundamentally in the purine moiety on introduction of a cyclophosphate group," so that known procedures for purine nucleosides cannot predictably be applied to nucleoside 3',5'-cyclic phosphates.

BRIEF SUMMARY OF THE INVENTION

According to this invention there are provided compounds of structure

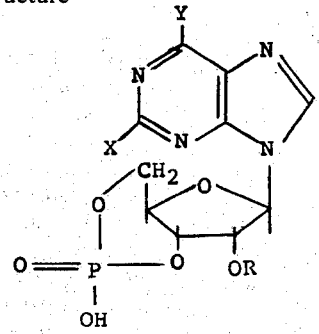

wherein Y is Cl or Br and X is Cl, F or Br, R being hydrogen or $C_1$–$C_{18}$ acyl. Also provided is the novel 2-chloroadenosine 3',5'-cyclic phosphate, a biologically active material which may be derived from, e.g., the 2,6-dichloropurine 3',5'-cyclic ribonucleotide of the invention.

DETAILED DESCRIPTION OF THE INVENTION

We have obtained novel 2,6-dihalopurine cyclic nucleotides by a diazotization procedure which may be depicted as proceeding according to the following diagram, where X and Y are as previously defined:

With the 2 amino-6-halo-9-β-D-ribofuranosyl purine 3',5'-cyclic phosphate III in hand, the novel 2,6-dihalopurine 3',5'-cyclic nucleotides IV are prepared by adaptation of the procedure reported by Gerster and Robins in *J. Org. Chem.* 31, 3258 (1966) for preparation of the corresponding nucleosides, viz., the compound III is treated with nitrous acid in the presence of an appropriate concentrated halogen-containing acid. Thus, reaction of III (Y = Cl) in the presence of concentrated HCl yielded the preferred compound, 2,6-dichloro-9-β-D-ribofuranosyl purine 3',5'-cyclic phosphate. Fluoroboric acid and HBr, respectively, provide

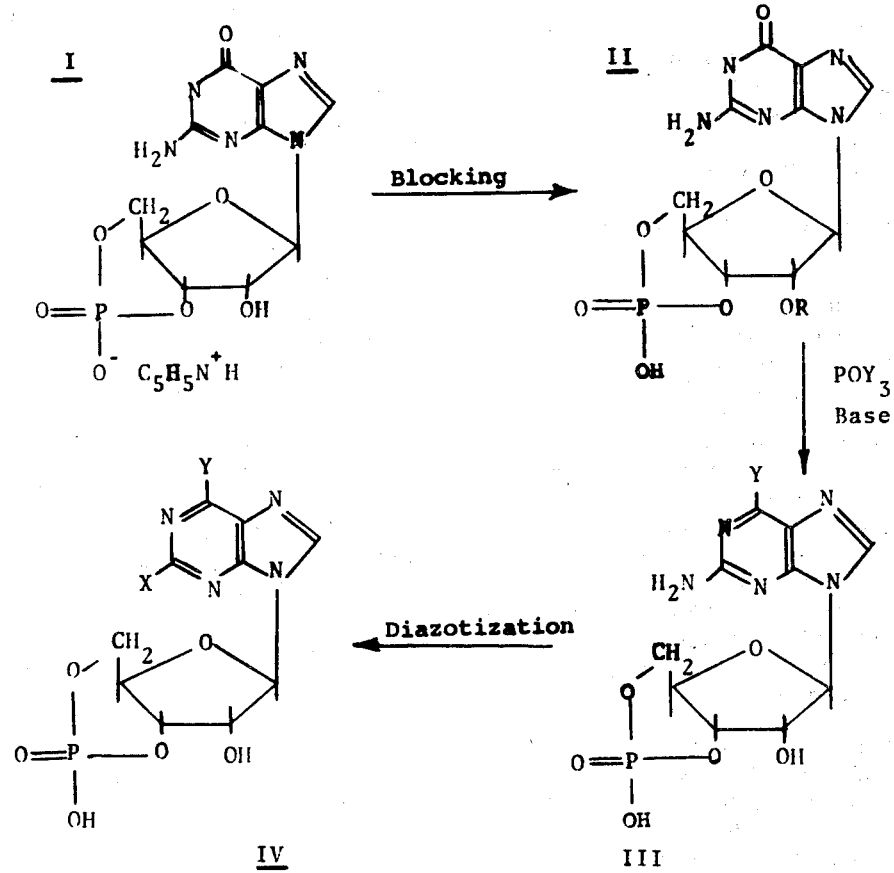

The 2'-hydroxyl of the pyridinium salt I of guanosine 3',5'-cyclic phosphate (cyclic-GMP) is first blocked, as by acetylation of I in aqueous acetic acid-acetic anhydridepyridine to yield the 2'-O-acetate II. This product is then converted to the 2-amino-6-chloro-9-β-D-ribofuranosyl purine 3',5'-cyclic phosphate III via the method of Gerster, Jones and Robins, J. Org. Chem. 31, 966 (1965) for triacetyl guanosine, using refluxing POCl₃ and N,N-diethylaniline. Netherlands Pat. No. 6913671 states that when ordinary 6-hydroxypurine ribonucleoside 3',5'-cyclic phosphates are treated with POCl₃ and a base such as diethylaniline, no conversion to the 6-chloropurine cyclic nucleotide is had, decomposition products instead prevailing. On the other hand, according to the patentees, the 6-chloropurine 3',5'-cyclic nucleotides can be obtained by direct treatment with POCl₃ in the absence of the tertiary amine base, and compound III is referred to although no exemplary preparation is reported. Surprisingly, in our hands no III (Y = Cl) was formed from II in the presence of POCl₃ unless the tertiary amine base was employed. The compound III (Y = Br) may be similarly obtained with POBr₃ and tertiary amine base.

the corresponding 2-fluoro and 2-bromo cyclic nucleotides. Considering that the phosphate linkage of cyclic AMP and its analogs has long been known to be sensitive to hydrolysis in acid environs, e.g., M. Smith et al, *J. Am. Chem. Soc.* 83, 698 (1961) it is indeed gratifying that the compounds of the invention may be obtained in the manner stated.

Sutherland et al, in *Biochim. et Biophys. Acta* 148, 106 (1967) have demonstrated that acylation of cyclic-AMP enhances cellular transport of the purine nucleotide. With the compounds of the present invention, acylation of the 2'-hydroxyl is by conventional reaction of the particular purine nucleotide with acid anhydride or acid halide to yield R in the structure above equal to $C_1$–$C_{18}$ acyl, preferably $C_1$–$C_4$ acyl.

Treatment of 2,6-dichloropurine 3',5'-cyclic ribonucleotide with aqueous ammonia at room temperature yields the novel compound 2-chloroadenosine 3',5'-cyclic phosphate which, as appears from Examples III and IV infra, activates cyclic-AMP dependent protein kinase while exhibiting superior resistance to phosphodiesterase degradation relative to cyclic-AMP. At higher temperatures, e.g., 100°C, treatment of any of the 2,6-dihalopurine 3',5'-cyclic ribonucleotides of the invention yields 2,6-diaminopurine 3',5'-cyclic ribonucleotide, demonstrated by Posternak in C.R. Acad. Sc. (Paris) Ser. D 272, 622 (1971) to be more active than cyclic-AMP itself in liberating growth hormone from the pituitary gland.

The invention is further illustrated in the following examples of the preferrd embodiments thereof.

EXAMPLE I

A. 2'-O-Acetylguanosine 3',5'-Cyclic Phosphate Pyridinium Salt

To a hot solution of 50 g guanosine 3',5'-cyclic phosphate (pyridinium salt) in 50 ml water was added 500 ml acetic acid portionwise with heating and swirling on the steam bath such that the final temperature was 70°–80°. With continued stirring, 600 ml acetic anhydride was added portionwise, with sufficient heating to insure that the temperature never fell below 50° and solution was maintained. As stirring was continued, 300 ml pyridine was added portionwise over 2 min as the temperature slowly rose. After addition was complete, the temperature was allowed to rise to 100° and the flask was plunged into an ice bath and rapidly cooled to 20°. An additional 100 ml water was added, and the solution was stirred 30 min, then evaporated in vacuo to near dryness. The residue was triturated with 100 ml pyridine, then ether (500 ml) was added. The product was collected on a filter, washed with ether, and dried at 80° and high vacuum; yield 46 g; $R_{c-GMP}$= 3.9 on cellulose thin-layer chromatography (tlc) plates in MeCN/0.2 N NH$_4$Cl: 7/3. Pmr spectra (DMSO-d$_6$, DSS internal standard shows the expected 6 aromatic protons between $\delta$ 7.9 and 9.1, and a singlet (3 protons) at $\delta$ 2.18 ppm

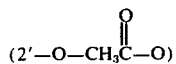

(2'—O—CH$_3$C—O)

B. 2-Amino-6-chloro-9-$\beta$-D-ribofuranosylpurine 3',5'-Cyclic Phosphate

A mixture of 10 2'-O-acetylguanosine 3',5'-cyclic phosphate, pyridinium salt, 4 ml freshly distilled N,N-diethylaniline, and 100 ml phosphoryl chloride was refluxed 5 min, then evaporated in vacuo. To the residue was added ice (50 g) and 2 N sodium acetate (150 ml). The mixture was stirred until solution occurred and was then passed through a column of 1000 ml Dowex 50 × 8 (H$^+$), 100–200 mesh. The column was eluted with water and the fractions containing the product (as determined by monitoring the absorbance of the eluate at 313 nm) were passed onto a column of activated charcoal (250 ml). The charcoal was washed until salt-free, and the product was eluted with ethanol/water/conc amonium hydroxide: 5/4/1. The material thus obtained was, after removal of the solvent in vacuo, combined with material obtained in the same manner starting with 13 g 2'-O-acetylguanosine 3',5'-cyclic phosphate and converted to the triethylammonium salt by dissolution in methanol containing excess triethylamine and evaporation in vacuo. This material was chromatographed on a column of 200 g silica gel (Baker 3405) packed in chloroform. The product was eluted with chloroform/methanol (6/1), converted to the free acid with Dowex 50 × 8 (H$^+$) and co-evaporated with aqueous n-butanol to yield 2.55 g of a solid: $\lambda_{max}$ (H$_2$O) 248, 310 nm. $R_{c-GMP}$ = 2.6 in MeCN/0.2 N NH$_4$Cl (7/3) on Merck cellulose tlc plates.

C. 2,6-Dichloro-9-$\beta$-D-ribofuranosylpurine 3',5'-Cyclic Phosphate

A solution of 0.70 g of the ammonium salt of 2-amino-6-chloro-9-$\beta$-D-ribofuranosylpurine 3',5'-cyclic phosphate in 7 ml conc hydrochloric acid was cooled to −10°, and 0.75 g NaNO$_2$ was added. Stirring was continued for 2 hr, keeping the temp <0°. The mixture was diluted with 25 ml ethanol, and the filtered solution was evaporated in vacuo (bath temp <20°). The residue was taken up in 40 ml n-butanol/acetic acid/water (6/2/2), and the filtered solution was applied to a column containing 250 ml Avicel microcrystalline cellulose packed in the same solvent. Elution was performed with the same solvent, and the fractions containing the product were evaporated in vacuo. Addition of ethanol and toluene, followed by evaporation, was performed 3 times, giving the product as a while solid, 0.45 g.

The product was homogeneous by tlc (Merck cellulose plate, MeCN/ 0.2 N NH$_4$Cl: 4/1, $R_f$ = 0.35). The electrophoresis (pH 7.1), the pmr spectrum and the ultraviolet spectrum [$\lambda_{max}$ (H$_2$O) 253, 273 nm (ratio of peak heights 1:2] were consistent with the assigned structure.

EXAMPLE II

2-Chloroadenosine 3',5'-Cyclic Phosphate Acetate.

To a solution of 0.5 g 2-amino-6-chloro-9-$\beta$-D-ribofuranosylpurine 3',5'-cyclic phosphate in 5 ml conc HCl (cooled to −10°) was added a solution of 1.0 g sodium nitrite in 1.0 ml H$_2$O dropwise over 30 min with stirring and ice-salt bath cooling. After stirring an additional 15 min, the solution was poured into 75 ml ethanol, and 25 ml conc NH$_4$OH was added. After standing overnight, the solution was evaporated in vacuo, taken up in water and passed through a column containing 100 ml Dowex 50 (H$^+$) 100–200 mesh. The water was removed in vacuo. The residue was taken up in n-butanol/acetic acid/water (5/2/3) and chromatographed on a 3.5 × 25 cm column of Avicel microcrystaline cellulose, packed and eluted with the same solvent. Fractions containing the product were evaporated, giving 0.09 g product, which contained one mole of acetic acid. $\lambda_{max}$ (pH 1) 262 nm, $\epsilon$ = 13,700; $\lambda_{max}$ (pH 11) 262 nm, $\epsilon$ = 14,300. $R_{c-GMP}$= 2.3, determined on Merck cellulose plates developed in MeCN/0.2 N NH$_4$Cl (7/3).

Anal. Calcd. for C$_{10}$H$_{11}$ClN$_5$O$_6$P .CH$_3$CO$_2$H: C, 34.01; H, 3.58; Cl, 8.37; N, 16.53. Found: C, 33.85; H, 3.78; Cl, 8.51; N, 16.38.

EXAMPLE III

Activation of Cyclic-AMP dependent Protein Kinase

Cyclic-AMP dependent protein kinase was purified to the stage of DEAE-cellulose chromatography from bovine brain using the procedure of Miyamoto et al., J. Biol. Chem. 244, 6395 (1969). A preparation having a specific activity of 2500 was obtained. Protein kinase activity was assayed by measuring the incorporation of P-32 phosphate into histone from $\delta$-p32 labeled ATP. The incubation mixture contained (final volume of 0.2 ml, amounts in $\mu$moles): sodium glycerol phosphate buffer, pH 6.0, 10; $\delta$-p$^{32}$-ATP about 1 × 10$^6$ cpm, .00053; magnesium acetate, 910; sodium fluoride, 2; theophylline, 0.1; EDTA, .06; histone, 500 $\mu$g; c-AMP or analog as indicated; purified protein kinase, 5–25 $\mu$g. After incubation an aliquot of the reaction mixture (0.1 ml) was transferred to discs of Whatman 3MM filter paper, air dried and washed with 6% TCA for 15 minutes at room temperature. After repeated washings with 6% TCA and finally with ether, the air-dried discs were transferred to liquid scintillation vials and radioactivity determined. One unit of protein kinase activity was defined as that amount of enzyme which will transfer 1 pmole of $P^{32}$ from $\delta$-$p^{32}$-ATP to histone in 5 minutes at 30°C. Table I shows the values for the ratio of activity of the test compound, as measured by $P^{32}$ incorporated into histone, relative to adenosine-3',5'-cyclic phosphate at various concentrations. Table II shows the apparent $K_a$ values (activation constants) for the test compound and its relative $K_a'$ value to adenosine-3',5'cyclic phosphate.

TABLE I

Activation of Bovine Brain Protein Kinase[a].

| Concentration (moles) | $10^{-6}$ | $5 \times 10^{-7}$ | $10^{-7}$ | $5 \times 10^{-8}$ |
|---|---|---|---|---|
| 2-Chloro-cyclic-AMP | .93 | .99 | .71 | .54 |
| Cyclic-Amp | 1 | 1 | 1 | 1 |

[a] = ratio of activity of ($p^{32}$ incorporation into histone) in the presence of cyclic-AMP at the indicated concentration.

TABLE II $K_a$ Value Relative to Cyclic-AMP

| Compound | Ka | $\frac{\text{Ka-analog}}{\text{Ka-cyclic-AMP}} = Ka'$ |
|---|---|---|
| 2-Chloro-cyclic-AMP | $10.9 \times 10^{-8}$ | 2.5 |
| Cyclic-AMP | $4.3 \times^{-8}$ | |

EXAMPLE IV

Specific Phosphodiesterase Activity of 2-Chloroadenosine 3',5'-Cyclic Phosphate

The basic incubation mixture (final volume 1.0 ml) contained the following components (amounts in $\mu$ moles): Tris buffer, pH 7.50, 44; magnesium chloride 2.0; cyclic AMP or analog, 5.0; rabbit kidney 3',5-c-AMP phosphodiesterase 850 $\mu$g. After incubation for 20 minutes at 30°C, the reaction was heated at 90°C for 2.5 minutes and then cooled in ice. Crotalus atrox venom phosphodiesterase (100 $\mu$g/0.1 ml) was added and incubation continued at 30°C for 10 minutes. The reaction was terminated by the addition of 0.1 ml of cold 55% trichloroacetic acid. After addition of trichloroacetic acid, the precipitate was removed by centrifugation, and aliquots of the supernatant fluids were analyzed for inorganic phosphate colorimetrically by the ascorbic acidmolybdate method of Lowry et al, *J. Biol. Chem.* 162, 421 (1946). As a control, a reaction mixture was heated at 90°C. 2.5 minutes with no incubation at 30°C and no addition of venom. This phosphate value was used as a control for the interference of the analogs in the phosphate determination. As appears from Table III, the 2-chloro-cyclic-AMP compound of the invention proved more resistant to phosphodiesterase degradation than cyclic-AMP itself.

TABLE III

| Compound | %Substrate Conversion |
|---|---|
| 2-Chloro-Cyclic-AMP | 86 |
| Cyclic AMP | 100 |

Having described our invention with especial reference to the preferred embodiments thereof, we wish it understood that the invention is not limited thereto, but only to the lawful scope of the appended claims.

We claim:

1. A compound of structure:

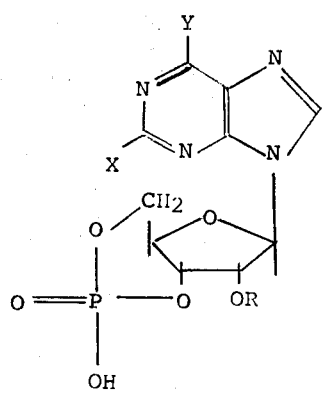

wherein R is hydrogen or $C_1$–$C_{18}$ acyl, Y is Cl or Br, and X is Cl, F or Br.

2. The compound of claim 1 wherein X and Y are Cl.
3. The compound of claim 2 wherein R is $C_1$–$C_4$ acyl.
4. The compound of claim 1 wherein R is hydrogen.
5. The compound of claim 2 wherein R is hydrogen.
6. A compound of structure:

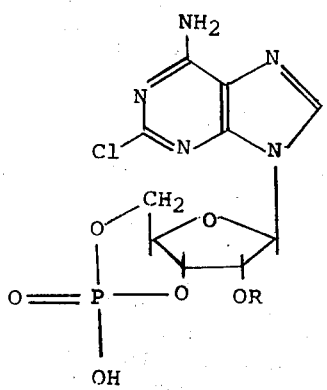

where R is hydrogen or $C_1$–$C_{18}$ acyl.

* * * * *